United States Patent [19]

Brokaw

[11] 3,887,863

[45] June 3, 1975

[54] SOLID-STATE REGULATED VOLTAGE SUPPLY

[75] Inventor: Adrian Paul Brokaw, Burlington, Mass.

[73] Assignee: Analog Devices, Incorporated, Norwood, Mass.

[22] Filed: Nov. 28, 1973

[21] Appl. No.: 419,616

[52] U.S. Cl...................... 323/19; 323/1; 323/22 T; 323/23
[51] Int. Cl.............................................. G05f 1/48
[58] Field of Search............ 307/296, 297; 323/1, 4, 323/16, 19, 22 T, 23, 25

[56] References Cited
UNITED STATES PATENTS

| | | | |
|---|---|---|---|
| 3,617,859 | 11/1971 | Dobkin et al. | 323/4 |
| 3,754,181 | 8/1973 | Kreitz et al. | 323/1 |

*Primary Examiner*—A. D. Pellinen
*Attorney, Agent, or Firm*—Parmelee, Johnson & Bollinger

[57] ABSTRACT

A solid-state (IC) regulated voltage supply compensated for effects of changes in temperature comprising first and second transistors operated at different current densities. Associated circuitry develops a voltage proportional to the $\Delta V_{BE}$ of the two transistors and having a positive temperature coefficient. This voltage is connected in series with the $V_{BE}$ voltage of one of the two transistors, having a negative temperature coefficient, to produce a resultant voltage with nearly zero temperature coefficient. A feedback circuit responsive to current flow through the two transistors automatically adjusts the base voltages to maintain a predetermined ratio of current density for the two transistors. Other embodiments provide higher-level DC outputs and compensation for base current flow.

19 Claims, 4 Drawing Figures

SOLID-STATE REGULATED VOLTAGE SUPPLY

BACKGROUND OF THE INVENTION

1. Field of the Invention

This invention relates to regulated DC voltage supplies. More particularly, this invention relates to solid-state (IC) regulators capable of maintaining a substantially constant DC output voltage in the face of temperature variations.

2. Description of the Prior Art

Conventional prior-art regulated voltage supplies commonly have included an internal reference source and an error amplifier arranged to compare the reference voltage with a pre-set fraction of the regulated DC output voltage. The output of the error amplifier is directed to a control element, such as a controllable impedance or the like, arranged to adjust the output DC voltage so as to maintain the two compared voltages equal. Fluctuations in the DC output voltage are thereby reduced.

In transistorized voltage-regulator circuits, the reference source typically has been a Zener diode. However, as is known in the art, Zener diodes have certain inherent characteristics which undesirably restrict the capability of a voltage regulator. An alternative type of solid-state regulator has been developed which does not use a Zener diode reference, relying instead on certain temperature-dependent characteristics of the base-to-emitter voltage ($V_{BE}$) of a transistor.

U.S. Pat. No. 3,617,859 discloses a circuit of the latter type which includes a diode-connected transistor operated at one current density, and a second transistor operated at a different current density. These two transistors are interconnected with associated circuitry so as to develop a voltage proportional to the difference in the respective base-to-emitter voltages ($\Delta V_{BE}$). This difference voltage has a positive temperature-coefficient (TC), and is connected in series with the $V_{BE}$ voltage of a third transistor, having a negative TC, to produce a composite resultant voltage which serves as the output of the regulator. Since the temperature coefficients of the two individual voltages are of opposite sign, the output voltage can be made relatively insensitive to temperature variations by proper choice of certain parameters.

Although such regulators based on the $V_{BE}$ characteristic of transistors have significant advantages, the circuit arrangements proposed and used heretofore suffer from serious limitations. It is a principal object of the present invention to provide a solid-state voltage regulator which avoids or significantly minimizes such limitations of prior art regulators.

SUMMARY OF THE INVENTION

In an exemplary embodiment of the present invention, to be described in detail hereinbelow, there is provided a two-transistor voltage-regulator circuit wherein the ratio of current densities of the two transistors is automatically controlled to a predetermined value (different from unity) by a negative feedback arrangement. A voltage corresponding to the $\Delta V_{BE}$ of the two transistors is developed, having a positive TC, and this voltage is connected in series with the $V_{BE}$ voltage of one of the two transistors, having a negative TC. The circuit parameters are selected so that the resultant combined voltage has a very low temperature coefficient. The regulator of this invention provides important advantages over previous regulators, as will be outlined hereinbelow in describing specific embodiments of the invention.

DESCRIPTION OF PREFERRED EMBODIMENTS

Figure 1:
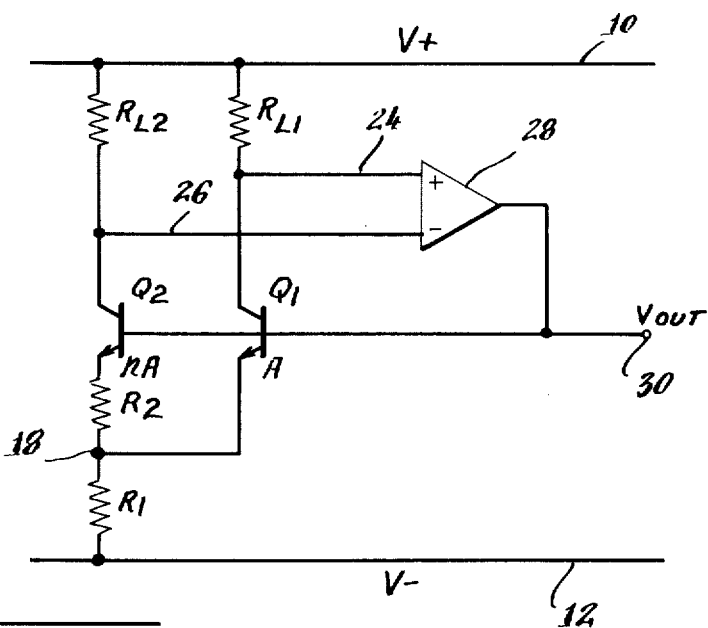
FIG. 1 is a circuit diagram of one embodiment of the present invention.

Referring now to FIG. 1, there is shown a circuit diagram representing basic components and interconnections of a regulated voltage source in accordance with the present invention. The circuit includes a pair of transistors $Q_1$ and $Q_2$ which are supplied with operating voltages by positive and negative voltage lines 10 and 12. The emitter of the left-hand transistor $Q_2$ is coupled through two series-connected resistors $R_2$ and $R_1$ to the negative voltage line 12, and the emitter of the other transistor $Q_1$ is connected to the common junction 18 between the two resistors.

The invention proceeds on the concept of (1) developing a first voltage, having a positive temperature coefficient (TC), (2) combining that voltage serially with a second voltage having a negative TC, and (3) relating the two temperature coefficients in a complementary sense such that the resultant composite voltage has a very low TC, approximately zero. To develop the positive TC voltage, the two transistors $Q_1$ and $Q_2$ are controllably operated at markedly different current densities (i.e., referring to density of current flowing through the emitters), and a voltage is produced proportional to the difference in the two transistor base-to-emitter voltages, referred to as $\Delta V_{BE}$.

In the specific embodiment disclosed herein, transistor $Q_2$ is operated at a smaller current density than the other transistor $Q_1$. Such difference in current densities can be produced (1) by using identical transistors operating at unequal currents, (2) by using transistors having unequal emitter areas operating at equal currents, or (3) by some combination of the latter two arrangements. Simply by way of example, in the described embodiment the emitter areas of the transistors $Q_1$ and $Q_2$ are specified as A and nA respectively, with n being greater than one, and the currents through the two transistors are equal.

The transistor currents are forced to be equal by a negative feedback arrangement comprising current-sensing means in the form of equal-resistance load resistors $R_{L1}$ and $R_{L2}$ in the collector circuits of transistors $Q_1$ and $Q_2$. These load resistors develop voltages which are proportional to the respective collector currents, and which are directed by leads 24, 26 to the input terminals of a high-gain operational amplifier 28. The output of this amplifier is connected to a common base line of the two transistors $Q_1$ and $Q_2$, and also to an output terminal 30 presenting the DC output voltage of the regulator. The amplifier 28 drives the common base line until the voltage drops across the load resistors $R_{L1}$ and $R_{L2}$ are equal, thereby forcing the transistor collector currents to be equal. By using well matched transistors $Q_1$ and $Q_2$, the emitter currents also will be equal.

Since the bases of transistors $Q_1$ and $Q_2$ are connected together, the difference voltage $\Delta V_{BE}$ will appear across emitter resistor $R_2$, and the current through that resistor thus will be directly proportional to $\Delta V_{BE}$. The seriesconnected resistor $R_1$ also carries this emitter current, and additionally carries the emitter current of the second transistor $Q_1$. Since the latter emitter current is directly proportional to the first emitter current (actually equal, in this particular example), it will be evident that the total current through resistor $R_1$, and hence the voltage across that resistor, also will be directly proportional to $\Delta V_{BE}$.

It has previously been established that, for two transistors operating at different current densities, the difference in base-to-emitter voltage is given by:

$$\Delta V_{BE} = kT/q \; \ln J_1/J_2$$

where T is absolute temperature, $k$ is Boltzman's constant, $q$ is the charge of an electron, and $J_1/J_2$ is the ratio of the transistor current densities. Accordingly, the voltage developed across resistor $R_1$ is independent of absolute emitter current, and is a linear function of absolute temperature with a positive temperature coefficient.

As is evident from the circuit lay-out, the voltage across resistor $R_1$ is in series with the $V_{BE}$ voltage of transistor $Q_1$ and the resultant composite voltage constitutes the DC output voltage on terminal 30. Since $V_{BE}$ has a negative temperature coefficient, changes in that voltage with temperature tend to complement the positive TC changes in the voltage across resistor $R_1$.

To approach zero TC, the output voltage at the regulator terminal 30, with respect to the negative voltage line 12, should be set approximately to the value of the energy band-gap voltage ($V_{GO}$), extrapolated to 0°. For silicon, this extrapolated voltage is 1.205V. A slightly higher voltage produces superior results. It can be shown mathematically, based on certain reasonable assumptions, that for zero TC the output voltage should be set at:

$$V_{OUT} = V_{GO} + (m-1)k \; To/q$$

where $m \cong 1.5$ and To is the nominal operating temperature

This voltage $V_{OUT}$ can be adjusted to the desired value by proper selection of resistor $R_1$, such that the resistive voltage drop complements the $V_{BE}$ of $Q_1$ to optimize the total (sum) voltage for zero TC.

When the DC output voltage ($V_{OUT}$) at terminal 30 drops below the pre-established optimal level, the ratio of collector currents $I_2/I_1$ is larger than the ratio of load resistors $R_{L1}/R_{L2}$ (i.e., larger than one), so that the input to amplifier 28 is positive. This causes the amplifier output to increase, so as to return the voltage $V_{OUT}$ back up to the optimal level. If the DC output rises above optimal, the feedback action of amplifier 28 will have the opposite effect. Thus the voltage-control circuit continuously holds the DC output voltage at the proper level to provide a very low overall temperature coefficient, close to zero.

Figure 2:
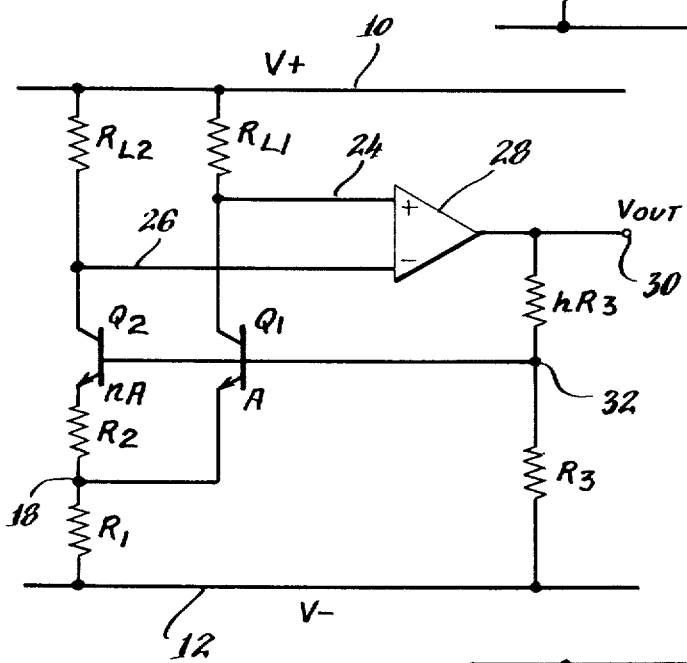
FIG. 2 is a circuit diagram of a modified arrangement to provide higher regulated output voltages.

In some applications, DC output voltages higher than the energy band-gap voltage may be required. FIG. 2 shows an arrangement for that purpose. The basic operation of this circuit is similar to that of FIG. 1, and like reference numerals are used throughout for corresponding elements. However, FIG. 2 differs in that the output of amplifier 28 is connected to a voltage-dividing network comprising two series-connected resistors $hR_3$ and $R_3$. The common junction terminal 32 of these resistors provides a voltage which is a predetermined fraction of $V_{OUT}$, and this voltage is directed to the commonly connected bases of transistor $Q_1$ and $Q_2$.

As before, the amplifier 28 drives the transistor bases until their collector currents are equal. By proper selection of circuit parameters, the reference voltage ($V_{REF}$) at this stable point can be set to be optimum for achieving zero TC. The output voltage ($V_{OUT}$) then will be some predetermined multiple of $V_{REF}$, specifically $(h+1) \cdot V_{REF}$.

Figure 3:
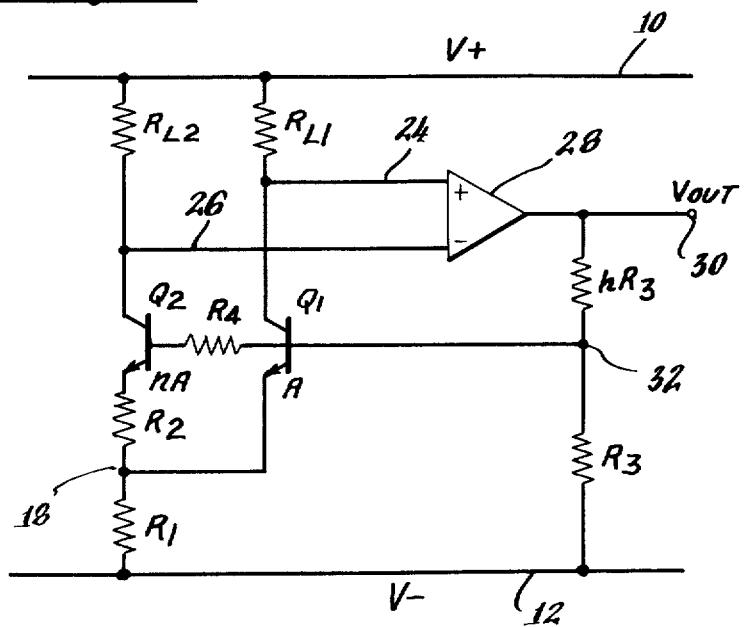
FIG. 3 shows a further circuit arrangement modified to reduce base current effects.

This arrangement of FIG. 2 provides a quite accurate result. It is degraded only a small amount due to the base current of the transistors. This base current is relatively low, and in any event the positive TC of the transistor beta tends to act with the positive TC of the emitter current to stabilize the base current and reduce any drift.

Where further reduction of such small drift effects may be desirable, a controlled beta PNP may be used to reflect the base current from a pair matched to $Q_1$ and $Q_2$ and connected in cascode with them into the base of $Q_1$ and $Q_2$. Alternatively, the base of transistors $Q_1$ and $Q_2$ can be connected together through a resistor $R_4$, as illustrated in FIG. 3. Here, the voltage across resistor $R_2$ is no longer $\Delta V_{BE}$, since the bases are no longer at the same voltage. However, it can be shown that this arrangement may, with matched betas, produce the basic regulation of the FIG. 2 embodiment, but with reduced drift due to base current, providing $R_4$ is selected such that:

$$R_4 = hR_3/h + 1 \times R_2/R_1$$

To take into account the possible effects of base spreading resistance of the two transistors, further analysis indicates that the base-connecting resistor $R_4$ should be selected such that:

$$R_4 = R_{b1} \; C_1 \; (1 + 1/C_2 \; (C_1 + 1) \;) - R_{b2}$$

where $R_{b1}$ and $R_{b2}$ are the base spreading resistances of transistors $Q_1$ and $Q_2$; $C_1 = I_{e1}/I_{e2}$ (emitter currents of $Q_1$ and $Q_2$); and $C_2 = R_1/R_2$ The above-derived expression for $R_4$ also indicates that the use of a base-connecting resistor may be helpful in the basic circuit configuration of FIG. 1. For $R_4$ to be zero, $R_{b2}$ must be larger than $R_{b1}$; typically, however, $Q_2$ is the larger transistor with a very low base resistance, and design considerations thus suggest that the base resistance of $Q_1$ should be minimized. It may be possible to correct for the effect with a pinched base resistor in series with the large transistor.

Voltage-regulated supplies in accordance with the present invention have a number of important and beneficial features. Foremost, such voltage supplies provide a highly stable output voltage in the face of changing ambient temperature. Only two matched active elements are required, rather than three as in the above-identified U.S. Pat. No. 3,617,859. Advantageously, the reference voltage in the disclosed circuits appears in the control loop at a point with a high impedance, so that it can readily be driven. Moreover, the reference voltage may be multiplied as desired to produce output voltages higher than the band-gap voltage, by means of a single control loop, and without stacking junctions. In the FIG. 2 configuration, the reference voltage can first be adjusted to minimize temperature coefficient, and then the output voltage can separately be adjusted to a predetermined voltage without affecting the temperature coefficient. The basic circuit is convenient to trim by adjusting a single resistor ($R_1$). Finite beta and beta drift does not result in uncorrectable errors; only beta matching is required.

Figure 4:
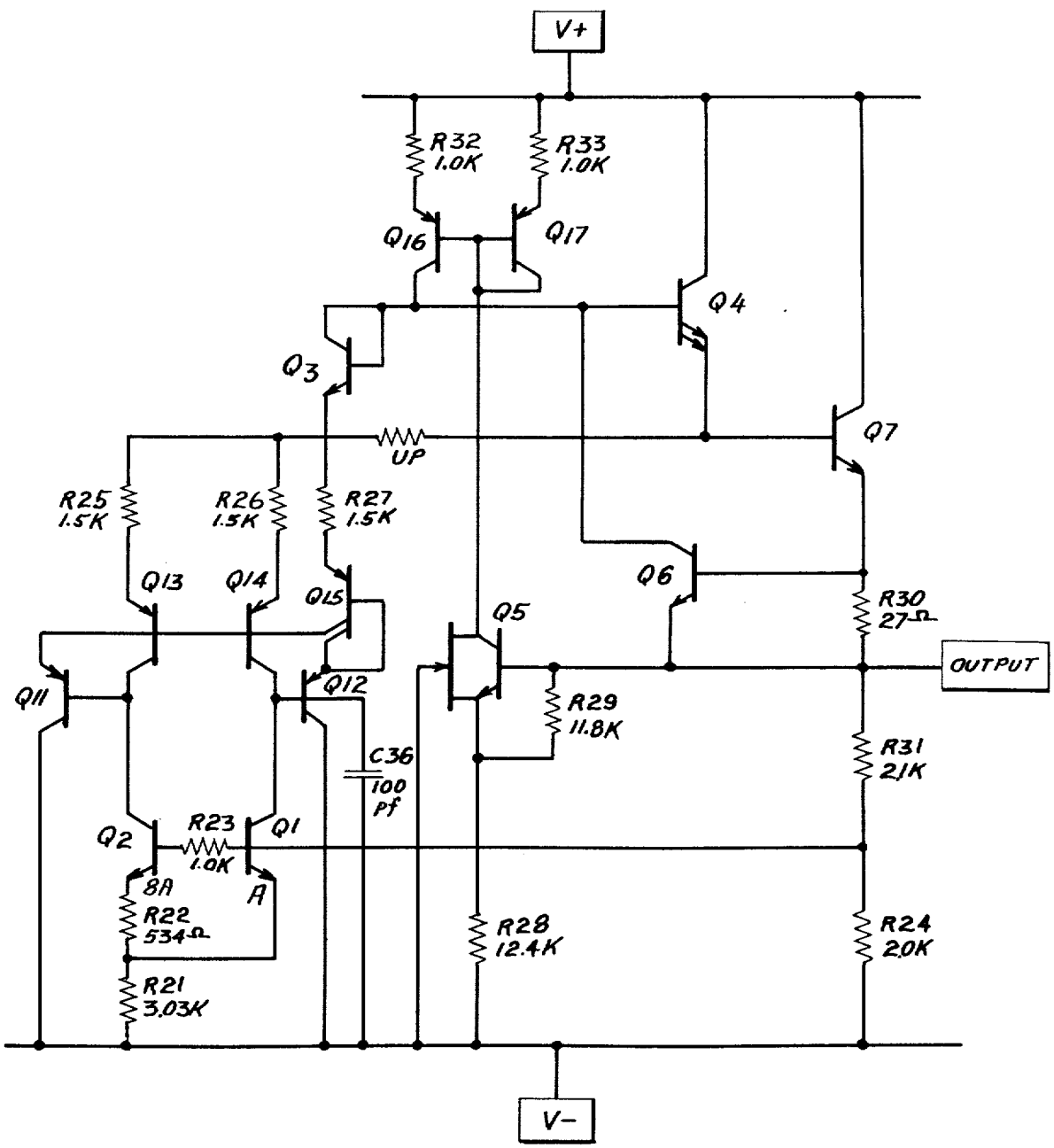
FIG. 4 is a circuit diagram of a voltage reference source including means to establish bias levels and to provide current limiting.

Referring now to FIG. 4, there is shown a voltage reference source including transistors $Q_1$ and $Q_2$ used to establish the reference voltage in the manner generally as described hereinabove. In this circuit, these transistors are driven so that they will operate at equal collector currents. Neglecting R23, for the moment, the bases of these transistors are driven from the circuit output by the voltage divider consisting of R31 and R24. The output current is provided by Darlington-connected transistors $Q_4$ and $Q_7$, which draw operating current from the input voltage terminal. The base of $Q_4$ is driven by a bias current from $Q_{16}$.

The circuit output voltage is controlled by adjusting the base voltage of $Q_4$, so that $Q_4$ and $Q_7$ form a voltage follower. A voltage drop provided by $Q_3$ approximately matches the $V_{BE}$ of $Q_4$, with R27 and $Q_{15}$ providing a voltage drop matching other circuit voltages. The base voltage of $Q_4$ is controlled by the emitter follower $Q_{12}$ which is driven by $Q_1$ and $Q_{14}$.

In operation the collector current of $Q_2$ drives the base of $Q_{11}$ negative. Acting as an emitter follower, $Q_{11}$ turns on $Q_{13}$ and drives it until its collector current approximately equals the collector current of $Q_2$. The base of $Q_{13}$ connects to $Q_{14}$, a matching transistor. Since R25 and R26 are also matched, the collector current of $Q_{14}$ will approximately equal that of $Q_{13}$ and hence of $Q_2$. If the collector current of $Q_2$ exceeds the collector current of $Q_1$, $Q_{14}$ will drive the base of $Q_{12}$ positive. Alternatively, if the collector current of $Q_1$ exceeds the collector current of $Q_2$, it will also exceed that of $Q_{14}$ and will, therefore, drive the base of $Q_{12}$ negative. The circuit output voltage will follow the base voltage at $Q_{12}$ as previously explained.

The emitter area of $Q_2$ is eight times larger than that of $Q_1$. When the voltage at the base of $Q_1$ and $Q_2$ is low, the current through R21 and R22 is low. The resulting voltage drop across R22 will be low, and the base-emitter voltages of $Q_1$ and $Q_2$ will be nearly equal. As a result of the area ratio mismatch the emitter current in $Q_2$ will be nearly eight times the current in $Q_1$. This current mismatch will cause $Q_{14}$ to drive the base of $Q_{12}$, and, thereby, the output -- positive.

If the base voltage applied to $Q_1$ and $Q_2$ is made larger, the current through R21 and R22 will also be larger. At a sufficiently high base voltage the voltage drop across R22 will limit the current in $Q_2$, and it will drop below the current in $Q_1$. The excess collector current in $Q_1$ will drive the base of $Q_{12}$ negative, and with it the circuit output.

Between these two extremes of base voltage there will be a voltage at which the collector currents of $Q_1$ and $Q_2$ are equal. At this voltage the current in $Q_{14}$ will balance the current in $Q_1$, and the base of $Q_{12}$ will be held at a voltage which maintains the circuit output and the $Q_1$ - $Q_2$ base voltage constant. Changes in output loading or other disturbances which tend to change the output voltage will change the voltage on the bases of $Q_1$ and $Q_2$. This will disturb their collector current balance so as to drive $Q_{12}$ to restore the output voltage. This control loop forcing the collector currents of $Q_1$ and $Q_2$ to be equal satisfies the condition, previously described, to hold constant $C_1 = 1$.

With the collector currents of $Q_1$ and $Q_2$ forced to be equal, the voltage drop across R22 will be $(kT/q)$ 1n $J_1/J_2 = (kT/Q)$ 1n 8. The current in R21 will be just twice that in R22 so that the voltage across R21 will be proportional to the drop across R22. Therefore, the voltage at the base of $Q_1$ which results in the balance condition is the sum of the $V_{BE}$ of $Q_1$ and the temperature-dependent voltage on R21. This voltage is set (by selecting the ratio of R21 and R22) so that this voltage is just above the bandgap voltage and satisfies the conditions previously outlined for zero temperature coefficient.

The stabilized base voltage of $Q_1$ is a fraction of the circuit output voltage determined by R31 and R24. The output voltage is, therefore, a temperature stable multiple of the bandgap voltage determined by the resistor ratio. The interbase resistor R23 corrects for the offset and drift due to base current flow in R31. It also corrects for the base spreading resistance of $Q_1$, as previously noted.

The voltage divider R28 and R29 is connected across the circuit output voltage. It is selected to have a Thevenin equivalent output voltage which differs from the circuit output voltage by the bandgap voltage. The equivalent resistance at the divider output is set at twice the resistance of R21. Transistor $Q_5$ is designed to match $Q_1$. As a result of the equivalent voltage and resistance applied across its base and emitter, its emitter and collector currents will be approximately equal to those of $Q_1$. This current drives the common base of $Q_{16}$ and $Q_{17}$, a matched transistor pair. The matched emitter resistors, R32 and R33, force the emitter currents of $Q_{16}$ and $Q_{17}$ to be equal and raise the output impedance of $Q_{16}$. This current mirror "reflects" the collector current of $Q_5$ down through $Q_3$, R27 and $Q_{15}$. A small fraction of this current drives the base of $Q_4$ which in turn drives $Q_7$ and also supplies the current for $Q_{13}$ and $Q_{14}$. Since the current in the $Q_5$, $Q_{17}$, $Q_{16}$ and $Q_3$ path approximates the current in $Q_2$, it is approximately half the current in $Q_{13}$ and $Q_{14}$ combined. This combined current is the majority of the emitter current in $Q_4$. By making the emitter area of $Q_4$ twice that of $Q_3$, the current densities and hence the base-emitter voltages of $Q_3$ and $Q_4$ are made nearly equal. Therefore, the voltage at the top of R27 approximately equals the voltage applied to R25 and R26. The currents in R25, R26 and R27 are approximately equal so that the voltage drops across them are approximately equal. Similarly, $Q_{15}$ is sized so that its emitter current density approximates that of $Q_{13}$ and $Q_{14}$. In this way the base voltage of $Q_{15}$ is made nearly equal to the base voltage of $Q_{13}$ and $Q_{14}$. This equality is translated through the base-emitter voltage of the matched transistors $Q_{11}$ and $Q_{12}$ to the collectors of $Q_2$ and $Q_1$. This keeps the collector voltages of these transistors approximately equal at all temperatures and bias conditions. This minimizes problems resulting from different base width modulation in $Q_1$ and $Q_2$ which might result from unbalanced collector voltage.

The bias voltage stabilization also keeps the free collector voltage of $Q_{15}$ nearly equal to the base voltage. This helps to insure an equal split of the current in the forced beta transistor $Q_{15}$ (beta = 1). This current split ensures equal emitter currents in $Q_{11}$ and $Q_{12}$, thereby minimizing errors due to differences between their base currents.

The circuit as described so far would have a stable "off" state. The epitaxial layer FET portion of $Q_5$ eliminates this possibility. The FET provides a small starting current that turns on the circuit when voltage is applied. Although it diverts some of the current from R28, it has only a small effect on the current delivered to $Q_{17}$. This total current is determined largely by the voltage drop across the equivalent R28, R29 resistance. The slight change in $Q_5$ $V_{BE}$ which results from the diverted current is a small fraction of the total voltage applied to R28 and R29.

The frequency stability of the output control loop is established by C36. This capacitance rolls off the open-loop gain to unity below the frequency at which excess phase shift in the PNP's might cause instability.

Output overload protection is provided by $Q_6$ and R30. The output current flows through R30 and produces a small voltage drop across it. In the event of overload, this voltage will rise and drive $Q_6$ on. As $Q_6$ comes on it will divert the drive current from the base of $Q_4$ into the load. As a result, the output current is limited to that necessary to drive $Q_6$ on by way of R30.

The overall circuit consists of a current input amplifier which operated the control loop stabilizing the reference voltage. The amplifier input circuit, $Q_{13}$ and $Q_{14}$, is bootstrapped to the regulated output. This bootstrap connection minimizes the effects of power supply voltage variation on the amplifier which improves the overall supply voltage rejection of the circuit.

Although several preferred embodiments of the invention have been described hereinabove in detail, it is desired to emphasize that such details have been disclosed for the purpose of illustrating the nature of the invention, and should not be considered as necessarily limiting of the invention which can be expressed in many modified forms to meet particular requirements.

I claim:

1. A solid-state temperature-compensated voltage supply comprising:
    first and second transistors;
    a resistor connected between the emitter of said first transistor and the emitter of said second transistor;
    circuit means for furnishing supply voltage to said two transistors to develop current flow therethrough with the current through said first transistor also flowing through said resistor;
    means for sensing the magnitudes of the respective currents flowing through said two transistors;
    voltage-control means responsive to the currents sensed by said sensing means and operable to adjust the base potentials of said transistors to maintain the magnitudes of said transistor currents at levels which provide a predetermined non-unity ratio of current densities within the two transistors and thereby cause the current through said resistor to vary positively with respect to temperature of said two transistors;
    means for developing a first voltage proportional to said resistor current and for combining said first voltage with a second voltage which varies negatively with respect to temperature to produce a combined voltage having minimal overall variation with respect to temperature; and
    output means coupled to said last-named means and including an output terminal providing an output voltage proportional to said combined voltage.

2. Apparatus as in claim 1, wherein said voltage-control means comprises a high-gain amplifier serving as a comparator responsive to signals proportional to said transistor currents to produce an output signal corresponding to the difference between said signals proportional to said currents; and
    means coupling a voltage proportional to said output signal to the bases of said transistors to drive the base potentials to values providing the desired ratio of current densities in said transistors.

3. Apparatus as in claim 2, including a voltage-dividing network coupled in the output of said amplifier and having a network terminal providing a voltage which is a predetermined fraction of the amplifier output; and
    means coupling said network terminal to the bases of said transistors.

4. Apparatus as in claim 2, wherein said sensing means comprises first and second load resistors connected in the collector circuits of said transistors, respectively.

5. Apparatus as in claim 1, wherein said transistor bases are connected together to provide equal base potentials.

6. Apparatus as in claim 1, wherein said transistor bases are coupled together by resistor means to compensate for the effects of change in base current.

7. A solid-state temperature-compensated voltage supply comprising:
    first and second transistors;
    positive and negative voltage lines;
    means coupling one of said voltage lines to the transistor collectors;
    a resistor connected in a circuit between the emitter of said first transistor and the other of said voltage lines, to carry the current flowing through said first transistor;
    means connecting the emitter of said second transistor to the end of said resistor which is remote from said first transistor emitter;
    means for sensing the magnitudes of the respective currents flowing through said first and second transistors;
    voltage-control means responsive to said transistor currents and operable to adjust the base potentials of said transistors to maintain the magnitudes of said transistor currents at levels which provide a predetermined non-unity ratio of current densities when the two transistors and thereby cause the current through said resistor to vary positively with respect to temperature of said two transistors;
    means for developing a first voltage proportional to said resistor current and for combining said first voltage with a second voltage which varies negatively with respect to temperature to produce a combined voltage having minimal variation with respect to temperture; and
    output means coupled to said last-named means and including an output terminal providing an output voltage proportional to said combined voltage.

8. Apparatus as in claim 7, including first and second load resistors in the collector circuits of said transistors, respectively, to develop voltage drops proportional to the transistor currents flowing therethrough;

an amplifier having its input terminals connected to said collector circuits respectively to receive therefrom voltages proportional to the corresponding collector currents; and means connecting the output of said amplifier to the bases of said transistors to apply thereto a voltage proportional to the amplifier output to drive the base potentials to a value providing a null voltage at the input of said amplifier.

9. Apparatus as in claim 8, including a voltage-divider network connected to the output of said amplifier; and means coupling an intermediate point of said network to said transistor bases to provide thereto a control voltage which is a predetermined fraction of the amplifier output.

10. A solid-state regulated-voltage supply comprising:

first and second transistors;

positive and negative supply voltage lines;

means coupling one of said supply voltage lines to the collectors of said two transistors;

first and second resistors connected in series between the emitter of said first transistor and the other of said supply voltage lines to carry the current flowing through said first transistor;

means connecting the emitter of said second transistor to the junction between said first and second resistors, whereby said second resistor also carries the current flowing through said second transistor;

means establishing a predetermined relationship between the base potentials of said two transistors;

circuit means for establishing different current densities in said two transistors with the ratio of current densities being set at a predetermined value to cause the currents through said resistors to vary positively with respect to temperature; and output circuit means connected to the base of said second transistor for developing at an output terminal an output voltage proportional to the voltage across said second resistor combined serially with the $V_{BE}$ voltage of said second transistor.

11. In a voltage supply of the type comprising means to produce a first voltage having a positive temperature coefficient for combination with a second voltage having a negative temperature coefficient so as to develop a combined voltage having a substantially reduced overall temperature coefficient;

the improvement in said means for producing said first voltage having a positve temperature coefficient which comprises:

first and second transistors arranged to conduct respective currents therethrough;

means connecting the bases of said two transistors together to provide for tracking of the base potentials;

sensing means coupled to both of said transistors and responsive to said currents passing therethrough;

voltage-control means coupled to said sensing means and having an output circuit for producing a control voltage responsive to the change in the relative levels of said transistor currents;

means connecting said output circuit to the base of a least one of said transistors for automatically adjusting the base voltage thereof responsive to said control voltage so as to maintain the ratio of said transistor currents at a value which provides a non-unity ratio of current densities within said transistors; and means connected to the emitters of both of said at to produce a voltage proportional to the difference in base-to-emitter voltage of said two transistors to serve as said first voltage having a positive temperature coefficient.

12. A voltage supply as claimed in claim 11, wherein said voltage-control means comprises a high-gain amplifier producing said control voltage at its output.

13. A voltage supply as claimed in claim 12, including means coupling to said one transistor base a voltage proportional to the output voltage of said amplifier.

14. A voltage supply as claimed in claim 13, wherein said coupling means comprises voltage-dividing means to couple to said transistor base a voltage which is a pre-set fraction of the amplifier output voltage.

15. A voltage supply as claimed in claim 11, wherein the emitters of said two transistors have substantially different areas.

16. A voltage supply as claimed in claim 15, wherein said transistor currents are maintained equal.

17. A solid-state temperature-compensated voltage supply comprising:

first and second transistors arranged to conduct respective currents;

voltage means to provide base voltage to said transistor bases to produce current densities therein having a non-unity ratio;

circuit means including resistance means connected to the emitters of said two transistors to develop a first voltage proportional to the difference in base-to-emitter voltages of said transistors and to apply said first voltage to the emitter of said second transistor;

means coupling the bases of said two transistors together to provide for tracking of the base potentials;

an output terminal; and means coupling said output terminal to the base of said second transistor to provide at said output terminal an output voltage proportional to said first voltage combined with the base-to-emitter voltage of said second transistor.

18. A voltage supply as claimed in claim 17, wherein said voltage means comprises an amplifier the input of which is coupled to said two transistors to receive signals therefrom corresponding to the transistor currents; and means coupling the output of said amplifier to the bases of said two transistors to automatically maintain the base potentials at the value which produces the required transistor currents to maintain the transistor current densities at the desired non-unity ratio.

19. A voltage supply as claimed in claim 18, wherein said coupling means comprises a voltage dividing network arranged to apply to the base of said second transistor a voltage which is a predetermined fraction of the amplifier output voltage, whereby said amplifier output serves as said output terminal developing an output voltage which is greater than the base voltage at said second transistor.

* * * * *